June 1, 1954 — A. MAES — 2,679,693
ADJUSTABLE PIPE TEMPLATE
Filed Sept. 1, 1953
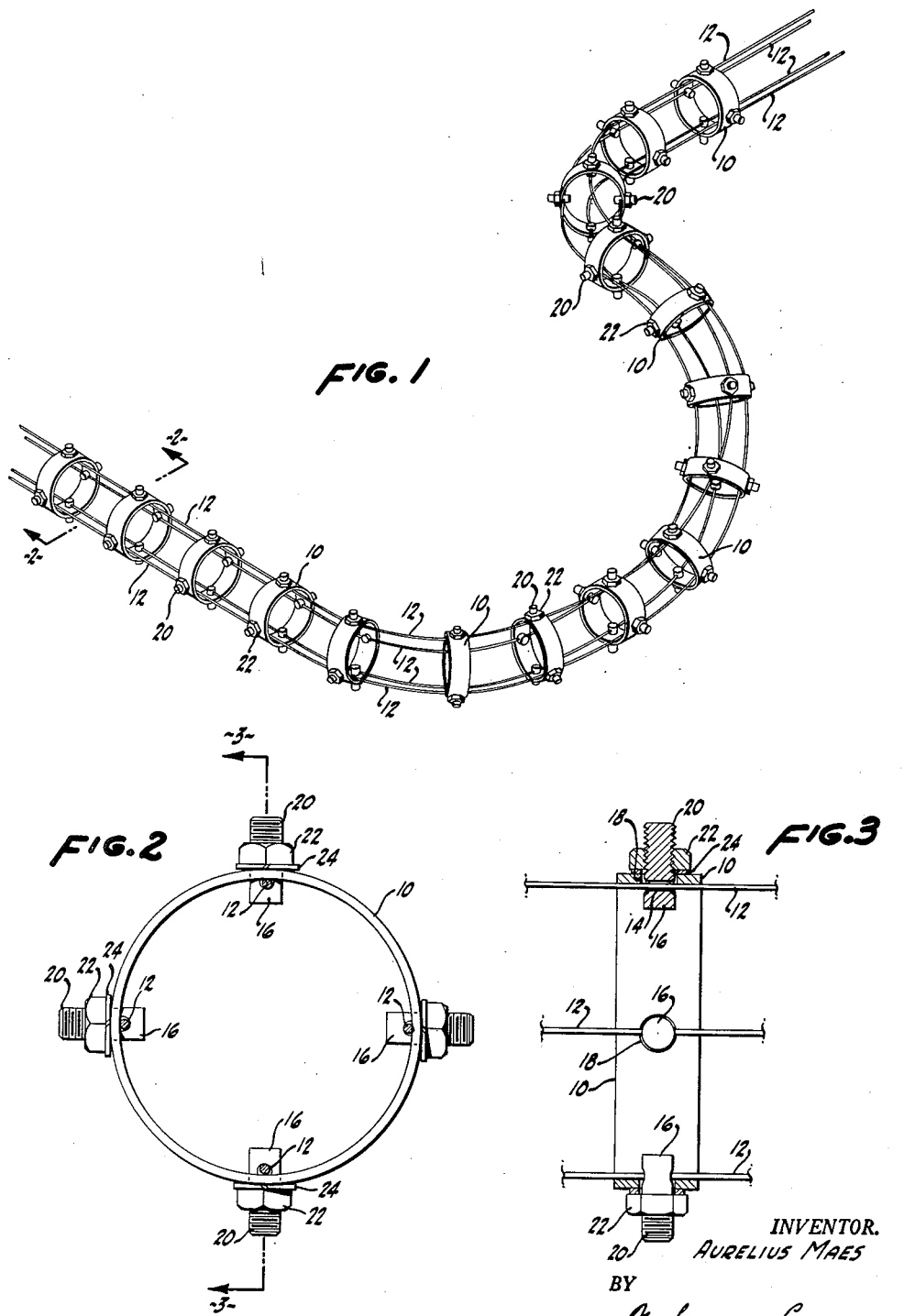
INVENTOR.
AURELIUS MAES
BY
ATTORNEYS Patented June 1, 1954

2,679,693

UNITED STATES PATENT OFFICE 2,679,693

ADJUSTABLE PIPE TEMPLATE

Aurelius Maes, Arcata, Calif.

Application September 1, 1953, Serial No. 377,820

4 Claims. (Cl. 33—174)

This invention relates to templates, and more particularly to a pipe template which is adapted to be formed into any desired compoundly curved shape and to substantially rigidly maintain said desired shape.

In the pipe fitting art, it is frequently necessary to connect a pipe bridging section of pipe to spaced and offset ends of pipe sections which might already be in place, and in the process of so doing it is frequently necessary that the bridging pipe section be bent into a compoundly curved shape in order to accomplish the proper placement of said section. The conventional approach to the placement of such a bridging section is to bend a pipe section at the locality where it is to be eventually installed so that the section approximates the desired shape, following which a trial fitting is made. After a series of successive bendings and re-bendings and trial fittings are made, the pipe section is finally converted to a shape which may be properly fitted into place. To my knowledge, there is no satisfactory comparative pattern, or template, which may be fitted to the ends of the pipe sections to be bridged, shaped to follow any desired path, fixed in the desired shape, and then removed to a centrally disposed pipe bending station for convenient and efficient use as a template.

The essential object of the present invention is to provide a pipe template which may be manipulated and used in the manner immediately above described to thus eliminate the disadvantages attendant upon use of prior known pipe templates.

This and other objects and advantages of the invention will be apparent from the following description taken in conjunction with the drawing forming part of this specification, and in which:

Figure 1 is a view in perspective of the pipe template of the invention, showing the same substantially rigidly fixed to assume a compoundly curved path;

Figure 2 is a view taken, for example, along lines 2—2 of Figure 1; and

Figure 3 is a view in section taken along lines 3—3 of Figure 2.

With reference to the drawing, the pipe template of the invention is comprised of a plurality of collar members 10, preferably of light weight metal, adjustably mounted on four thin gauge and relatively highly flexible wires 12, with said wires being radially spaced apart at intervals of 90°. The wires 12 extend through apertures 14 formed in stud members 16, said stud members in turn extending through apertures 18 formed in collar members 10. The stud members 16 are provided with threaded outer portions 20 having engaged therewith nuts 22. Lock washers 24 are preferably provided between nut 22 and collar members 10. Tightening of a particular nut 22 on a stud member causes the wire passing through the stud member to be fixedly clamped against the inside surface of the collar member.

In use, the template is affixed to the ends of pipe sections which are already in place, or, for example, to structural members at points where the ends of the pipe sections will be disposed upon eventual placement, with the template being provided with any desired form of terminal adapter means, not shown, for the purpose of connecting the ends thereof in place. Usually, the template has the ends thereof anchored in position while the template is in a flexible condition, as, for example, with three of the four nuts of each collar member in a loosened condition. The loosened nuts of each collar member are then tightened progressively from one end of the template to the other to fixedly position the collar members in such manner with respect to the four wires that the template as a whole is shaped to the desired form, as, for example, the compoundly curved form shown in Figure 1. When this has been done, the template has been converted from a flexible to a substantially rigid condition, and it may then be removed from its position and, for example, taken to a pipe fitting shop, or the like, for use as a pattern in the formation of the actual pipe section.

From the foregoing description, it will be apparent that the pipe template of the invention enables the achievement of the objects and the obtaining of the advantages above set forth, and while a specific embodiment of the invention has been shown and described it is to be understood that all substantial equivalents thereof are considered to be within the spirit and scope of the invention.

What is claimed is:

1. A pipe template comprising a plurality of spaced apart and generally axially aligned circular collar members, four radially disposed stud members slidably extending through apertures formed in each collar member and spaced apart at substantially 90° intervals, each of said stud members having a passage extending transversely therethrough in that portion thereof disposed inwardly of a collar member, with said passages being disposed in parallel with the central axis of the collar member associated therewith, four elongated flexible wires, with each wire commonly extending through the passages of the correspondingly positioned studs of said collar members and having a sliding fit within said passages, said studs having threaded portions extending outwardly of said collar members and having nuts disposed on said threaded portions, with said nuts being adapted upon being tightened on said stud members to fixedly and selectively clamp portions of said wires in engagement with said collar members to prevent relative movement between said collar members and said clamped wire portions.

2. A pipe template comprising four elongated flexible wires, a plurality of spaced apart circular collar members disposed transversely of said wires and in embracing relation with said wires as a group, means carried by said collar members for slidably connecting each wire to each of said members, with the points of connection between each member and said four wires being circumferentially spaced apart at substantially 90° intervals, and means associated with said first-mentioned means for individually clamping each of said wires to each of said members to prevent relative movement therebetween.

3. A pipe template comprising a plurality, in excess of two, elongated flexible wires, a plurality of spaced apart ring-like members disposed transversely of said wires, means carried by said members for slidably connecting each wire to each of said members, with the points of connection between each member and said wires being substantially equidistantly spaced apart with respect to the circumference of said member, and means associated with said first mentioned means for selectively and individually fixedly clamping each of said wires to each of said members.

4. A pipe template comprising a plurality of ring members in transversely and slidably disposed contactual arrangement with each of a plurality, in excess of two, elongated flexible wires, with each of the points of contact between said wires and a member being substantially equi-spaced apart angularly, and releasable clamping means carried by said ring members in engagement with said wires for selectively preventing sliding movement between each of said wires and each of said members.

References Cited in the file of this patent

UNITED STATES PATENTS

| Number | Name | Date |
|---|---|---|
| 140,071 | Perrin | June 17, 1873 |
| 940,118 | Bartels | Nov. 16, 1909 |
| 1,520,143 | Sandell | Dec. 23, 1924 |
| 2,205,311 | Sabatello | June 18, 1940 |

FOREIGN PATENTS

| Number | Country | Date |
|---|---|---|
| 347,410 | Germany | Jan. 18, 1922 |